Nov. 1, 1955      K. P. SHANK      2,722,050

METHOD OF MAKING A FLUID CHAMBER

Filed March 3, 1949

INVENTOR.
KENNETH P. SHANK
BY Richard A. Parsons
ATTY.

United States Patent Office 2,722,050
Patented Nov. 1, 1955

2,722,050

METHOD OF MAKING A FLUID CHAMBER

Kenneth P. Shank, Belding, Mich., assignor to Gibson Refrigerator Company, Greenville, Mich., a corporation of Michigan Application March 3, 1949, Serial No. 79,465

2 Claims. (Cl. 29—522)

This invention relates to a fluid chamber and especially to the method of making and assembling gas tight plugs for compartments containing gases under pressures such as those used in household refrigerating systems. The embodiment as shown in this specification seals the high pressure discharge cavity of a compressor.

It will be understood, of course, that this invention can be used in other devices where a gas tight seal is required and a pressure differential exists, and that the invention is not limited to gas tight plugs for compressors.

The principal object of this invention is to provide an inexpensive plug which is substantially gas tight and which will withstand the pressure differentials common in a mechanical household refrigerating system.

Another object of the invention is to provide a substantially gas tight plug which can be readily adapted to assembly line production of household refrigerators.

A still further object is to provide a novel method of connecting the high pressure line of a refrigerator to the compressor.

These objects will more fully appear as the specification is read in connection with the accompanying drawings, wherein.

Figure 3:
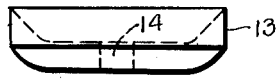
Figure 3 is an elevational view of one embodiment of the plug.
Figure 7:
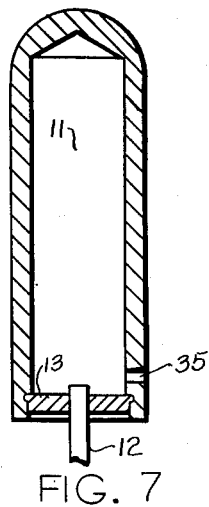
Figure 7 is a sectional view through the centerline of a gas chamber with the aforementioned plug pressed into the sealing position.
Figure 4:
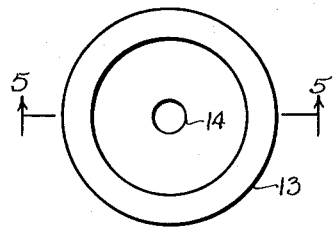
Figure 4 is a plan view of the aforementioned embodiment.
Figure 6:
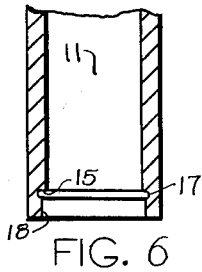
Figure 6 is a fragmentary sectional view through the centerline of the base of the gas chamber before the installation of the gas tight plug.

The present invention is embodied in a conventional household refrigerating system consisting of a compressor hermetically sealed within a steel shell 20, a condenser 21, restrictor 22 and evaporator 23. The compressor comprises a frame 10 in which a shaft 36 is mounted. Shaft 36 which is driven by an electric motor (not shown) operates Scotch yoke mechanism 37, which causes piston 30 to reciprocate. On the suction stroke of piston 30, the low pressure refrigerant is drawn through inlet tube 25 into intake muffler cavities 26 and 27, intake cavity 28, past intake reed valve 29, and into cylinder 31. On the compression stroke, reed valve 29 closes, the compressed refrigerant passes through port 33, opening reed valve 32, passing through outlet cavity 34, port 35, and into discharge muffler cavity 11. The high pressure gas then passes through outlet tube 12 to the exterior tubing of the refrigeration system and thence to condenser 21. The discharge cavity 11 may be drilled in the cylinder head. The mouth of the cavity 11 must be plugged in order that the maximum pressure reached by a household refrigeration system may be retained within. It is to the plugging of this cavity that the present invention relates.

In the embodiment of the invention described herein, a discharge tube 12 passes from the discharge cavity through the novel gas tight plug 13 to the high pressure side of the refrigerating system. This tube is passed through a punched hole 14 in the plug and is soldered to the plug prior to the plug's installation. It will be understood that the same principles apply to a plug with a tube passed through its center, as apply to a plug without a hole punched in it. It is not my intention to limit the scope of my invention to gas tight plug with tubes passed through them.

In preparation for the installation of gas tight plug 13, the mouth of drilled discharge cavity 11 is counterbored to furnish a shoulder 15 against which the protruding periphery 16 of plug 13 may be pressed. Shoulder 15 is broadened by cutting a groove or recess 17 at the base of the counterbore 18. In the embodiment described, groove 17 is a very shallow one and may be successfully replaced by a slight taper at the base of the counterbore.

Figure 5:
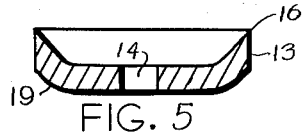
Figure 5 is a sectional view taken on substantially the line 5—5 of Figure 4.
Figure 1:
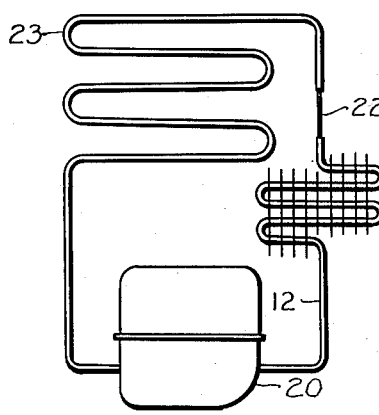
Figure 1 is a schematic diagram of a refrigeration system comprising a compressor, condenser, restrictor, evaporator, and associated tubing.
Figure 2:
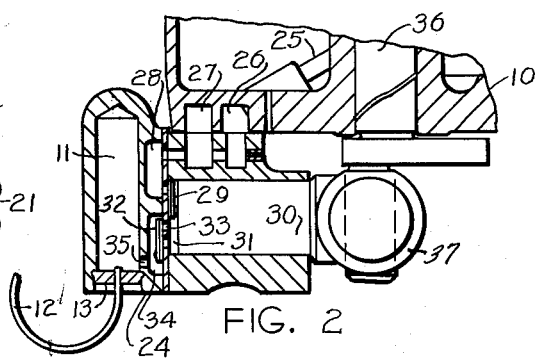
Figure 2 is a fragmentary sectional view of a compressor with a gas chamber sealed by my novel plug.

Plug 13 is of concavo-convex shape, as seen in Figures 3 and 5 and is provided with the hole 14 in the center. The plug may be manufactured from hot rolled steel or other suitable material and is so formed that it may be readily inserted in counterbore 18 before pressing. In other words, it is smaller than the largest part of the counterbore, but larger than the shoulder 15. When plug 13 is mechanically pressed into counterbore 18, protruding periphery 16 rides on shoulder 15 and flattens itself out until groove 17 is substantially filled and the exterior surface 19 of the plug is flat. Thus installed, gas tight plug 13 gives a novel and inexpensive seal capable of substantially retaining the high pressures required for household refrigeration systems.

After installation of the plug by this method, there may still be a slight gas leakage from the high pressure chamber, but in the present embodiment of the invention this chamber is within the hermetically sealed compressor shell 20. Consequently, the small amount of gas which escapes from the high pressure chamber is not lost but is retained in the low pressure side of the system until it is once again pumped into the high pressure chamber. Under these circumstances, the minute leakage is not objectionable.

The tiny leaks are the result of minute crevices left in the plug, groove and counterbore by the retracting of metal of plug 13 when the pressure exerted by the tool is released. I have discovered that these crevices can be filled and a hermetic seal obtained even though the chamber pressure is at least 500 lbs. per square inch. This is accomplished by coating the plug with molten solder or some other fluent metal prior to the insertion of the plug into the counterbore. When this operation immediately precedes the aforementioned pressing operation, a gas tight seal is achieved which can be successfully used to plug high pressure chambers which are not contained within another hermetically sealed chamber or shell. Under pressure, the metal coating fills the minute crevices in the plug, counterbore, and groove. When the pressure of the installing tool on the plug is released, an effective hermetic seal remains. A suggested procedure for coating the plug with molten solder is first to immerse the contact surfaces of the plug and counterbore in an acid cleansing fluid such as muriatic acid, then coat the plug with flux, and lastly, momentarily plunge the plug into molten solder and shake it vigorously upon withdrawal to remove the excess solder.

From the foregoing it will be seen that the present invention provides a novel form of gas tight seal for a fluid chamber, such as a chamber for gas under pressure. The seal is extremely economical and easy to install.

The scope of the invention is indicated in the appended claims.

I claim:

1. The method of connecting a conduit to a fluid chamber having an aperture therein which comprises shaping the side wall of said aperture to provide three juxtaposed perimetral zones encompassing said aperture; a first zone of a predetermined perimeter adjacent to the interior of the chamber, a second zone of a greater perimeter adjacent the exterior of the chamber, and a third zone of a still greater perimeter located intermediate the first and second zones whereby to provide an outwardly presenting shoulder between said first and third zones; providing a concavo-convex plug for reception in said aperture, said plug having a flat central portion with a centrally located opening therein, the perimeter of said plug being less than that of said second zone and greater than that of said first zone, inserting and sealing in said opening a conduit having its perimeter substantially equal to the perimeter of the opening in said plug, placing said plug in said aperture with the circumferential edges of the concave side adjacent said shoulder, and thereafter applying sufficient pressure to said plug adjacent the perimeter thereof to at least partially flatten said plug and force the material thereof about its perimeter against said wall in said third zone.

2. The method according to claim 1 wherein the surfaces of the plug which contact the wall of the fluid chamber and the conduit are coated with soft solder-like metal before being placed in the aperture in the fluid chamber.

References Cited in the file of this patent

UNITED STATES PATENTS

| | | |
|---|---|---|
| 166,451 | Brown et al. | Aug. 10, 1875 |
| 1,058,210 | Welch et al. | Apr. 8, 1913 |
| 1,641,269 | Hoke | Sept. 6, 1927 |
| 1,801,006 | Jacoby | Apr. 14, 1931 |
| 2,246,123 | Bruun | June 17, 1941 |
| 2,258,395 | Tome | Oct. 7, 1941 |
| 2,377,974 | Sherman | June 12, 1945 |
| 2,564,372 | Phelps et al. | Aug. 14, 1951 |

FOREIGN PATENTS

| | | |
|---|---|---|
| 79,884 | Switzerland | Jan. 11, 1918 |